US 6,994,227 B2

(12) United States Patent
Kwon

(10) Patent No.: US 6,994,227 B2
(45) Date of Patent: Feb. 7, 2006

(54) VACUUM CONTAINER TO PRESERVE FOOD

(76) Inventor: Man-Hyun Kwon, #103-1701, Sungwon Apt. 1552-19, Tade-dong, Saha-ku, Pusan, Kyongsangnam-do (KR)

( * ) Notice: Subject to any disclaimer, the term of this patent is extended or adjusted under 35 U.S.C. 154(b) by 198 days.

(21) Appl. No.: 10/630,576

(22) Filed: Jul. 30, 2003

(65) Prior Publication Data

US 2004/0155041 A1    Aug. 12, 2004

(30) Foreign Application Priority Data

Feb. 11, 2003  (KR) ................ 10-2003-008412
Jul. 9, 2003    (KR) ................ 2003-46424

(51) Int. Cl.
*B65D 51/16* (2006.01)
(52) U.S. Cl. .............. 220/212; 220/231; 220/367.1; 220/203.11; 215/228; 215/260; 215/262; 206/524.8; 141/65; 116/309; 251/322; 251/323
(58) Field of Classification Search ........... 220/203.11, 220/212, 231, 367.1; 215/228, 260, 262; 206/524.8; 141/65; 251/321, 322, 323
See application file for complete search history.

(56) References Cited

U.S. PATENT DOCUMENTS

| 2,416,900 | A | * | 3/1947 | Busby ................ 215/307 |
| 2,597,576 | A | * | 5/1952 | Donovan ............. 220/231 |
| 2,669,176 | A | * | 2/1954 | Lazerus .............. 99/472 |
| 2,680,477 | A | * | 6/1954 | Schira, Jr. .......... 137/565.12 |
| 2,890,810 | A | * | 6/1959 | Rohling ............. 220/231 |
| 3,320,097 | A | * | 5/1967 | Sugalski ............ 429/55 |
| 4,016,999 | A | * | 4/1977 | Denzer .............. 220/231 |
| 4,019,629 | A | * | 4/1977 | Dubner et al. ........ 206/315.9 |
| 4,051,971 | A | * | 10/1977 | Saleri et al. ........ 215/260 |
| 4,218,967 | A | * | 8/1980 | Batchelor ........... 99/472 |
| 4,222,276 | A | * | 9/1980 | DeRogatis .......... 73/714 |
| 4,249,583 | A | * | 2/1981 | Lundbladh .......... 141/65 |
| 4,278,114 | A | * | 7/1981 | Ruberg ............. 141/65 |
| 4,372,096 | A | * | 2/1983 | Baum ............... 53/88 |
| 4,428,478 | A | * | 1/1984 | Hoffman ............ 206/315.9 |
| 4,466,150 | A | * | 8/1984 | Jurt ................ 15/143.1 |
| 4,763,802 | A | * | 8/1988 | Johnston ............ 215/228 |
| 4,909,014 | A | * | 3/1990 | Kobayashi et al. .... 53/86 |
| 4,989,745 | A | * | 2/1991 | Schneider .......... 220/203.09 |
| 5,031,785 | A | * | 7/1991 | Lemme ............. 215/228 |
| 5,121,590 | A | * | 6/1992 | Scanlan ............ 53/510 |
| 5,195,427 | A | * | 3/1993 | Germano ........... 99/472 |
| 5,203,465 | A | * | 4/1993 | Baumgarten ........ 220/203.05 |
| 5,347,918 | A | * | 9/1994 | Chen ............... 99/472 |
| 5,364,241 | A | * | 11/1994 | Schultz ............. 220/203.11 |

(Continued)

*Primary Examiner*—Nathan J. Newhouse
*Assistant Examiner*—James Smalley
(74) *Attorney, Agent, or Firm*—Dilworth & Barrese LLP

(57) ABSTRACT

A vacuum container for preserving food is disclosed herein that includes a cover member for covering an upper part of a container member in which food is filled, a piston member equipped with the cover member and ascending and descending movable, and first and second valve members that alternately operate by a pumping operation using ascending and descending operation of the piston member to make a suction aperture and an exhaust aperture alternately open and close, thus discharging air from within the container member. Such operation allows the interior of the container member to become a vacuum state, thereby allowing food within the container member to be preserved for a longer time period, in a more sanitary manner, and a simple manufacture and a low manufacturing cost to provide users with convenience.

4 Claims, 17 Drawing Sheets

U.S. PATENT DOCUMENTS

| | | | | |
|---|---|---|---|---|
| 5,390,809 A | * | 2/1995 | Lin | 220/212 |
| 5,397,024 A | * | 3/1995 | Wu et al. | 220/231 |
| 5,405,038 A | * | 4/1995 | Chuang | 220/231 |
| 5,406,992 A | * | 4/1995 | Miramon | 141/65 |
| 5,449,079 A | * | 9/1995 | Yang | 215/228 |
| 5,465,857 A | * | 11/1995 | Yang | 215/228 |
| 5,469,979 A | * | 11/1995 | Chiou | 215/228 |
| 5,499,735 A | * | 3/1996 | Chen | 220/231 |
| 5,546,997 A | * | 8/1996 | Miramon | 141/65 |
| 5,558,243 A | * | 9/1996 | Chu | 220/212 |
| 5,564,480 A | * | 10/1996 | Chen | 141/65 |
| 5,564,581 A | * | 10/1996 | Lin | 215/228 |
| 5,577,335 A | * | 11/1996 | Tucker | 40/311 |
| 5,611,376 A | * | 3/1997 | Chuang | 141/65 |
| 5,617,893 A | * | 4/1997 | Webster | 137/526 |
| 5,651,470 A | * | 7/1997 | Wu | 220/212 |
| 5,653,352 A | * | 8/1997 | Kim | 215/228 |
| 5,692,632 A | * | 12/1997 | Hsieh et al. | 220/212 |
| 5,697,510 A | * | 12/1997 | Wang et al. | 215/262 |
| 5,735,317 A | * | 4/1998 | Wu | 141/65 |
| 5,765,608 A | * | 6/1998 | Kristen | 141/198 |
| 5,765,706 A | * | 6/1998 | Barker et al. | 215/230 |
| 5,779,082 A | * | 7/1998 | Miramon | 220/212 |
| 5,803,282 A | * | 9/1998 | Chen et al. | 215/228 |
| 5,803,283 A | * | 9/1998 | Barker et al. | 215/230 |
| 5,806,575 A | * | 9/1998 | Tsay | 141/65 |
| 5,944,212 A | * | 8/1999 | Chang | 220/212 |
| 5,957,317 A | * | 9/1999 | Lee | 220/212 |
| 5,984,122 A | * | 11/1999 | Barker et al. | 215/230 |
| 5,992,666 A | * | 11/1999 | Wu | 220/212 |
| 6,000,159 A | * | 12/1999 | Hornung | 40/307 |
| 6,044,756 A | * | 4/2000 | Chang | 99/472 |
| 6,045,011 A | * | 4/2000 | Yang | 222/401 |
| 6,059,133 A | * | 5/2000 | Lai | 215/230 |
| 6,375,024 B1 | * | 4/2002 | Park | 215/262 |
| 6,557,462 B1 | * | 5/2003 | Wang | 99/472 |
| 6,619,493 B2 | * | 9/2003 | Yang | 215/228 |
| 6,637,321 B2 | * | 10/2003 | Wang | 99/472 |
| 6,644,489 B2 | * | 11/2003 | Chang | 220/203.01 |
| 6,779,480 B2 | * | 8/2004 | Zamjahn | 116/308 |
| 6,789,690 B2 | * | 9/2004 | Nieh et al. | 220/231 |
| 2004/0084450 A1 | * | 5/2004 | Havens et al. | 220/203.07 |
| 2005/0051551 A1 | * | 3/2005 | Galletti et al. | 220/212 |
| 2005/0061812 A1 | * | 3/2005 | Vilatta et al. | 220/212 |

* cited by examiner

VACUUM CONTAINER TO PRESERVE FOOD

PRIORITY

This application claims priority under 35 U.S.C. §119 to an application filed in the Korean Intellectual Property Office on Feb. 11, 2003 and assigned Serial No. 2003-8412 and to an application filed in the Korean Intellectual Property Office on Jul. 9, 2003 and assigned Serial No. 2003-46424, the contents of which are incorporated herein by reference.

FIELD OF THE INVENTION

The present invention relates to a vacuum container to preserve food, which is provided in one body with a vacuum generating unit equipped with a cover of the container so as to rapid become a vacuum state in the interior thereof through a simple manipulation.

DESCRIPTION OF THE RELATED ART

Such various kinds of food as vegetables and fishes etc. is apt to be oxidized and spoiled through a contact with air into which harmful materials such as microorganisms, or oxygen etc. are contained.

Especially in fermentation food, a propagation of microorganisms is more activated, and a fermentation and ripening speed of food and is progressed too rapid, to thus cause a bad state during the preservation.

To delay such fermentation and spoilage of food it is important to cut off air from the outside, thus a hermetically sealed container, that is, a vacuum container is provided.

As such a vacuum container based on a conventional art, a vacuum airtight apparatus of container and a vacuum food preserving container were provided, but in the construction of such conventional art, an internal vacuum state was weak or a vacuum forming unit was equipped always separately to cause a loss possibility.

In the meantime, according to a conventional art for a food preserving container, as shown in FIG. 1 it is constructed of a first exhaust aperture 2a formed in an upper part of a cover 2, a first valve 3 for opening/closing an upper part of the first exhaust aperture 2a, a fixation keeping unit 2b of a pipe shape which is upward projected from an upper face of the cover 2 and which has a predetermined diameter on the centering of the first exhaust aperture 2a, a cap 4 sliding movable upward and downward along an outer circumference face of the fixation keeping unit 2b, a second exhaust aperture 4a piercing through an upper face of the cap 4 with a given diameter, and a second valve 5 for opening and closing an upper part of the second exhaust aperture 4a.

The interior space of the fixation keeping unit 2b and the cap 4 is provided as a pump room 6, and the first valve 3 and the second valve 5 are opened or closed by ascending and descending operations of the cap 4 oppositely each other.

That is, when the cap 4 ascends, the pump room 6 becomes a vacuum pressure state and the second valve 5 is closed, while the first valve 4 is opened to lead air into the pump room 6 from the interior of the cover 2.

To the contrary, when the cap 4 again descends, the first valve 3 is closed and the second valve 5 is opened to discharge air of the pump room 6 to the outside.

The repetition of such ascending and descending operations gradually discharges from the interior of the cover 2 to the outside, to thus make the interior of the cover 2 a vacuum state.

The cover 2 having such operation is combined with a given container to be able to form the interior of the container 1 as the vacuum state, thus more delaying a going-bad or spoiling time of food preserved in the container 1.

However, in such a conventional art, the ascending and descending sliding operation of the cap 4 to form the vacuum state had to be executed by hands one by one, furthermore its manipulation for forming vacuum was difficult because a force of upwards moving the cap 4 is more increased when a vacuum force formed in the interior of the cover 2 became larger.

Further, in manipulating the ascending and descending operation of the cap 4, the second valve 5 is equipped being exposed, with/to an upper face of the cap 4, thus a portion pressurized in the descending manipulation of the cap 4 to open the second valve 5 is not proper to cause an inconvenience or a difficulty to handle the cap 4 such as interfering with an operation of the second valve 5.

SUMMARY OF THE INVENTION

According to exemplary embodiments of the present invention, a container to preserve food is capable of rapid making an interior of the container a vacuum state by a piston operation using a spring elastic force, and of reducing a manipulating force for a vacuum formation, thus preserving food sanitarily and stably.

According to an exemplary embodiment of the present invention, a vacuum container to preserve food, includes a cover member for covering an upper part of a container member having a space in which food is filled, the cover member having a sliding hole formed with a predetermined diameter in a center thereof; a piston member of a pipe shape opened downward, in which a first exhaust aperture piercing through a center of an upper face thereof is formed with a given diameter, and a protrusion is formed in an outer circumference part of a lower end part thereof to be caught on a jaw part formed in an upper end part of the sliding hole of the cover member, the piston member being inserted into the sliding hole to be ascending and descending movable and to be prevented from deviating from the sliding hole; a lower cap member fastened to an outer circumference face of an extended part downward extended by a predetermined height from a circumference part of the sliding hole of the cover member, the lower cap member being for covering a lower end part of the sliding hole and having a suction aperture formed in a center thereof with a predetermined diameter; a first valve member, which has numerous air holes that are formed in an outer circumference part of a plate face thereof and is put in a bottom face of the lower cap member to control the suction aperture; a valve guide member mounted in an inner side of the lower cap member, an outer circumferential upper end part of which is pressurized by and fixed to a lower end part of the extended part of the cover member, and a lower part of which has a pipe shape into which the first valve member can be minutely ascending and descending movable, and an upper part of which is provided as a guide part upward extended by a pipe shape that has an inner diameter smaller than a diameter between the air holes formed in the first valve member, the valve guide member having a plurality of air holes that have a fine diameter and are formed on an upper face for connecting between circumferential faces of a stepped coverage thereof; a spring member in which a lower end part is put on an outer side of the guide part of the valve guide member and an upper part is inserted into the interior of the piston member to elastically support the piston member; a second valve member put to control the first exhaust aperture in the center of the upper face of the piston member, the second valve member having numerous air holes in an outer circumference part of a plate face thereof; and an upper cap member which is screw combined with an upper end part of an outer circumference of the piston member and which has a plurality of second exhaust apertures, the plurality of second exhaust apertures being formed in a side direction to be connected through the outside in an inner upper face in which the second valve member is accommodated.

According to an exemplary embodiment of the present invention, a vacuum container to preserve food, includes a cover member for covering an upper part of a container member having a space in which food is filled, the cover member having a sliding flute downward concaved in a center thereof with a predetermined diameter, wherein a bottom face center of the sliding flute is downward concaved with a diameter smaller than an inner diameter of the sliding flute to thus form a first valve flute, a center of the first valve flute being provided as a suction aperture piercing vertically thereon, and an upper end part of the sliding flute being provided as a deviation preventing flute; a first valve member, which has numerous air holes that are formed in an outer circumference part of a plate face thereof and which is put in the first valve flute to control the suction aperture provided in a center thereof; a valve guide member mounted whose lower part has a pipe shape in which the first valve member can minutely ascending and descending move, whose upper part is provided as a guide part that is formed being upward extended in a pipe shape having an inner diameter smaller than a diameter between ends of the air holes formed in the first valve member, and whose upper part face for connecting between outer circumference faces of an upper part and a lower part of the valve guide member has a plurality of air holes with a fine diameter; a spring member of which a lower end part is mounted on an outer side of the guide part of the valve guide member, and which has a vertical elasticity; a piston member of a pipe shape opened downward, of which the interior accommodates the spring member, and of which a center of an upper face has a second valve flute downward concaved with a predetermined diameter, a center of the second valve flute having an exhaust aperture piercing vertically, and of which opposite portions of an outer circumference face are formed as rotation preventing faces of a vertically cut plane face shape, an upper end one side of the rotation preventing face being formed as a stopping flute, and of which an outer circumference part of a lower end part is provided with a stopping jaw formed being extended outward from an outer diameter, the stopping jaw being provided with a sealing unit to closely adhere with an inner circumference face of the sliding flute of the cover member; a deviation preventing member, into which an outer circumference face of the piston member is matching inserted to be attachable and detachable, and which is mounted in an upper end part of the sliding flute, and which is provided with a protrusion that is formed in one body from a lower end part extended downward from an inner circumference face thereof; a second valve member mounted in the second valve flute formed in an upper face of the piston member, to control the exhaust aperture formed in the center of the piston member; and a cap member, which has an insertion flute formed in an inner circumference face thereof, the insertion flute being insertion combined with a protrusion that is formed being projected outward from an upper end part of an outer circumference face of the piston member, and which is provided with an exhaust flute that is formed by a radial type in a ceiling face and an inner circumference face thereof.

BRIEF DESCRIPTION OF THE DRAWINGS

The above and other features of the present invention will become readily apparent from the description of exemplary embodiments that follows with reference to the accompanying drawings, in which like reference numerals and symbols designate like elements, in which.

DETAILED DESCRIPTION OF EXEMPLARY EMBODIMENTS OF THE INVENTION

The present invention and exemplary embodiments thereof are more fully described below with reference to the accompanying drawings. This invention may, however, be embodied in many different forms and should not be construed as being limited to the exemplary embodiments set forth herein; rather, these exemplary embodiments are provided so that this disclosure is thorough and complete, and conveys the concept of the invention to those skilled in the art. In the inventive description, details of widely known functions of constructions will be omitted for the sake of brevity.

Figure 1:
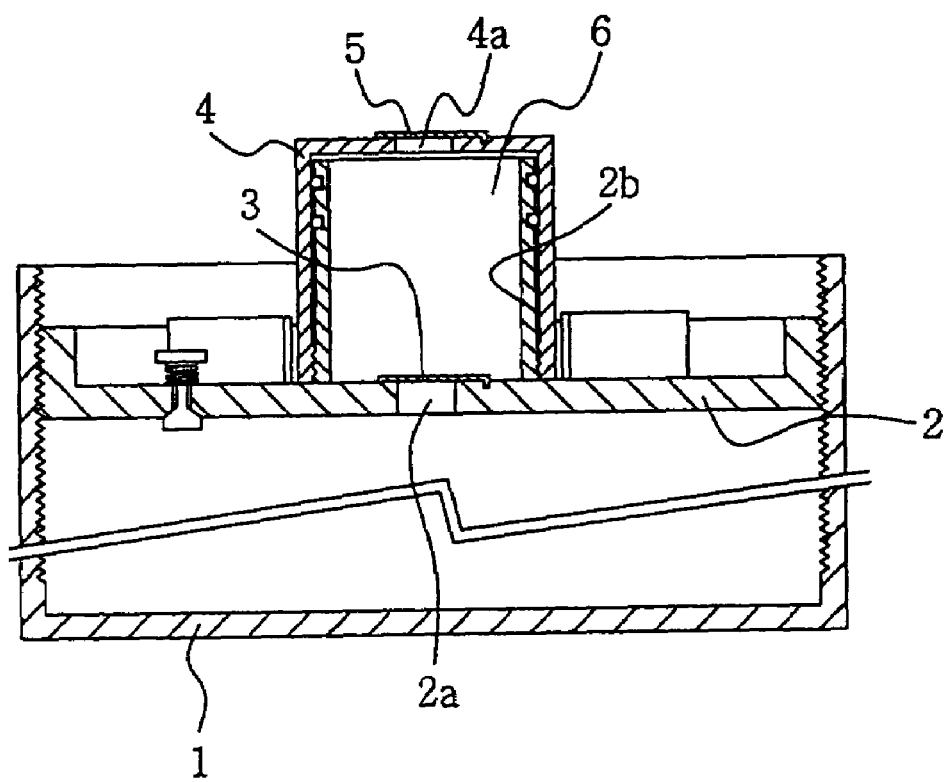
FIG. 1 is a sectional side view illustrating main components of a conventional vacuum container.
Figure 2:
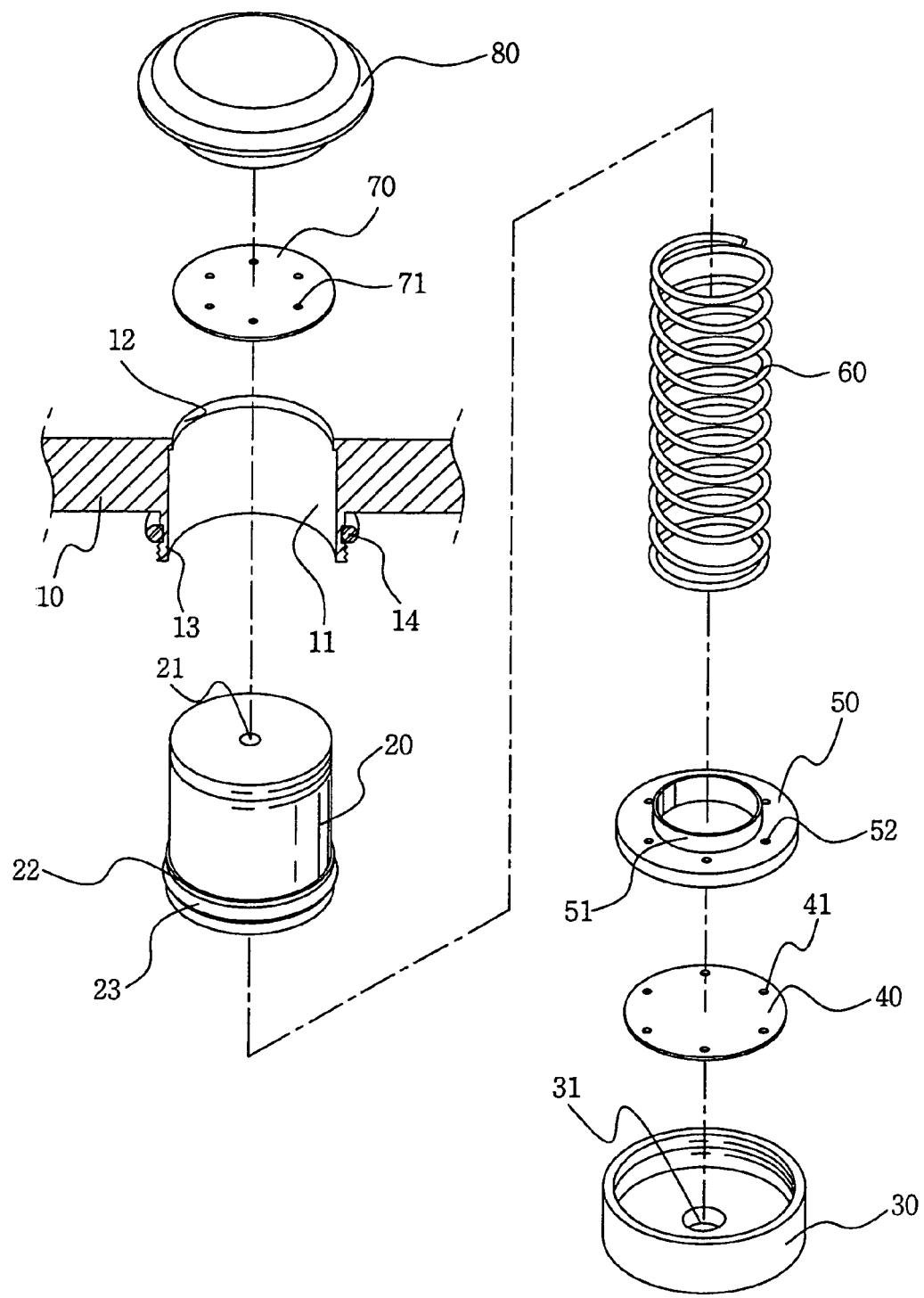
FIG. 2 is a perspective view illustrating structure of disassembled main components according to one exemplary embodiment of the present invention.
Figure 3:
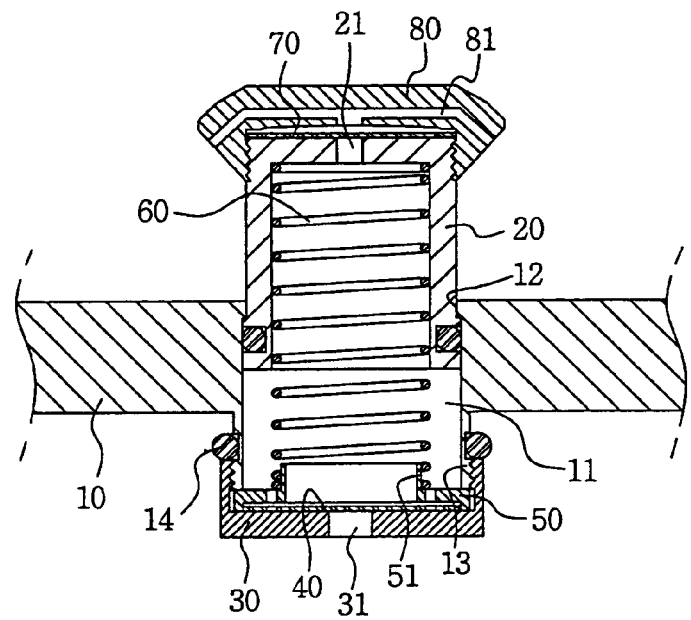
FIG. 3 is a sectional side view showing a combination state of components referred to FIG. 2.

FIG. 2 is a perspective view illustrating structure of disassembled main components according to one exemplary embodiment of the present invention, and FIG. 3 is a sectional side view showing a combination state of components referred to FIG. 2, in which a reference numeral 10 indicates a cover member for covering an upper part of a container member into which food is filled.

The cover member 10 has a sliding hole 11 that is vertically piercing through an upper partial face of the cover member and has a predetermined diameter. An upper end part of the sliding hole 11 is formed as a jaw part 12 being projected in such a shape that an inner diameter of the sliding hole 11 becomes narrowed, and a lower end part t of the sliding hole 11 is formed as an extended part 13 downward extended from an inner circumference face of the sliding hole more than a thickness of the cover member 10.

The present invention has such most remarkable characteristic that a pumping unit capable of generating vacuum in the interior of a container through the sliding hole 11 of the cover member 10 is assembled with therewith in one body.

The pumping unit includes, as main components, a piston member 20, a lower cap member 30, a first valve member 40, a valve guide member 50, a spring member 60, a second valve member 70, and an upper cap member 80.

The piston member 20 is pipe shaped and opened in a lower direction, the interior of which is vacant, a center portion of an upper face of which is provided as a first exhaust aperture 21 formed with a predetermined diameter, an outer circumference face of which is formed smaller than an inner diameter of the jaw part 12 formed in the upper end part of the sliding hole 11, and an outer circumferential lower end part of which has a protrusion 22 that has an outer diameter larger than the inner diameter of the jaw part 12. This protrusion 22 is provided with an O ring 23 to be closely contacted with an inner circumference face of the sliding hole 11.

Thus, the piston member 20 is inserted into the sliding hole 11 from a lower part thereof and is combined therewith to be sliding movable upward and downward till the protrusion 22 is caught on the jaw part 12 of the sliding hole 11 to prevent the piston member 20 from deviating upward.

The lower cap member 30 is screw combined with an outer circumference face of the extended part 13 that is extendedly downward projected from a circumferential part of a lower end part of the sliding hole 11 provided with the cover member 10 and that is formed extendedly more than a lower face of the cover member 10, so as to cover the lower end part of the sliding hole 11. That is, an outer circumference face's lower end part of the extended part 13 is screw combined with an inner circumference face of the lower cap member 30. Herewith, in order for a sealing state of the combination it is desirable to equip an O ring 14 with the outer circumference face of the extended part 13 so as to closely adhere with an upper end part of an outer side face of the screw-combined lower cap member 30.

A center of a plate face of the lower cap member 30 for covering the lower end part of the sliding hole 11 is provided as a suction aperture 31 which is formed vertically piercing through the plate face thereof, with a predetermined diameter.

The first valve member 40 is mounted in the interior of the lower cap member 30 screw combined with the extended part 13 of the cover member 10, and is provided as a thin plate of soft material to control the suction aperture 31. The first valve member 40 has a plurality of air holes 41 that are formed vertically piercing through the plate face with the same radius from a center of the plate face toward an outer circumference side thereof.

The valve guide member 50 is formed in a shape of a stepped coverage by connecting two rings having different diameters, and a lower part of the valve guide member 50 having a larger diameter is assembled being mounted in the lower cap member 30. Herewith, the valve guide member 50 is put therein so that the first valve member 40 can be minutely ascending and descending in a lower part of the valve guide member 50.

An upper part of the valve guide member 50 is formed as a guide part 51 whose outer diameter is smaller than an inner diameter of the piston member 20, and on a horizontal upper face for connecting an upper part of the valve guide member 50 with a lower part thereof, a plurality of air holes 52 having a predetermined diameter are formed by the concentric center. Such a valve guide member 50 is assembled, and the lower cap member 30 is screw combined with the extended part 13 of the cover member 10, then the lower end part of the extended part 13 strongly presses an upper face of an outer side of the air holes 52 provided with the valve guide member 50 so as not to move the valve guide member 50.

The spring member 60 as one of the pumping units is elastically installed between the piston member 20 and the valve guide member 50 and is an elastic return unit to elastically support the piston member 20 elastically ascending and descending. The spring member 60 is desirable to be provided as coil spring as shown in the drawing. An upper end part of the spring member 60 closely adheres with an inner upper face of the piston member 20, and a lower end part of the spring member 60 surrounds an outer side of the guide part 51 provided as an upper part of the valve guide member 50. The spring member 60 is mounted on the horizontal upper face that connects the upper part with the lower part of the valve guide member 50.

The second valve member 70 is formed as a thin plate of soft material, and has a plurality of air holes 71 formed by the concentric center, with the same shape as the first valve member 40, while the second valve member 70 is positioned on the upper face of the piston member 20. That is, the second valve member 70 is simply put on the upper face of the piston member 20 to control the first exhaust aperture 21 formed in the piston member 20.

Also, in the upper cap member 80, an outer circumference part of a lower end part is downward extended with a given length, and an inner circumference face is screw combined with an upper end part of an outer circumference face of the piston member 20, and a downward opened interior space allows the second valve member 70 to be ascending and descending movable by a minute width, the second valve member 70 being stably installed in the upper end part of the piston member 20. In an upper face of the interior space of the upper cap member 80, a second exhaust aperture 81 is formed being bent in a side direction and being connected through the outside. Herewith it is desirable to concentrically and radially form a plurality of second exhaust apertures 81 in the upper cap member 80.

Figure 4:
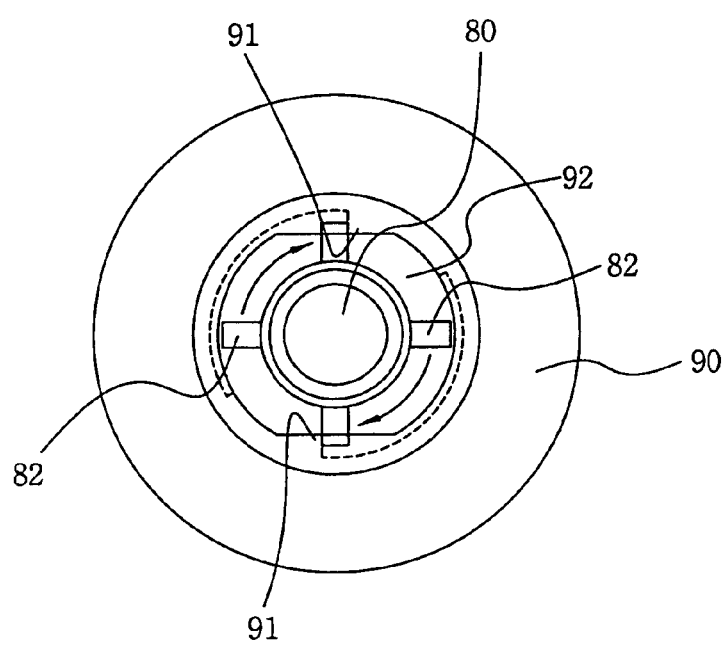
FIG. 4 is a plan view illustrating a fixed structure of a piston member provided under a descending state in a container member of a vacuum state according to an exemplary embodiment of the present invention.
Figure 5:
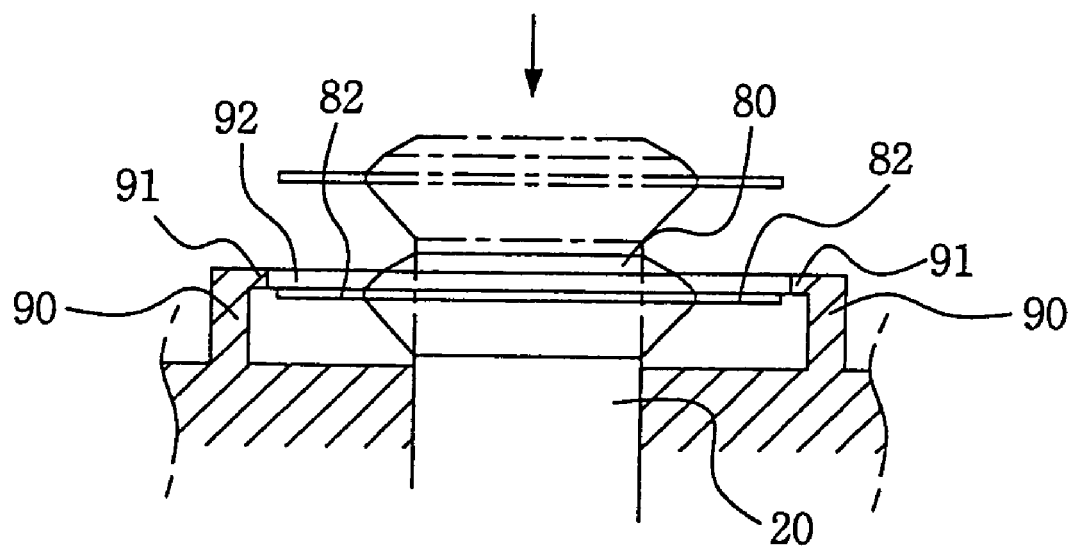
FIG. 5 is a sectional side view referred to FIG. 4.

Meanwhile, according to the present exemplary embodiment of the invention, in the upper cap member 80 combined with an upper end part of the piston member 20 as shown in FIGS. 4 and 5, projection plates 82 projected with a predetermined length from opposite outer circumference faces to an outer side are formed. Also, in an upper face of the cover member 10, a side cover member 90 of a pipe shape is equipped in one body or in an assembly type, surrounding the piston member 20, wherein the side cover member 90 has an inner diameter larger than a diameter between opposite ends of the projection plates 82 that are formed oppositely each other in the upper cap member 80. Herewith, an upper end part of the side cover member 90 is bent toward an inner side to thus form a horizontal jaw 91 which has an inner diameter minutely larger than an outer diameter of the upper cap member 80 and on which the projection plates 82 oppositely formed in the upper cap member 80 can be caught. Particularly, a circumference face of the horizontal jaw 91 is cut by a width in which the oppositely formed projection plates 82 can ascend and descend, to thus form an elevating hole 92.

The horizontal jaw 91 formed from the side cover member 90 is most desirable to construct to be positioned over rather than a position of the projection plates 82 projected from the upper cap member 80 to the outer side, when the piston member 20 was pressed at maximum.

Figure 6:
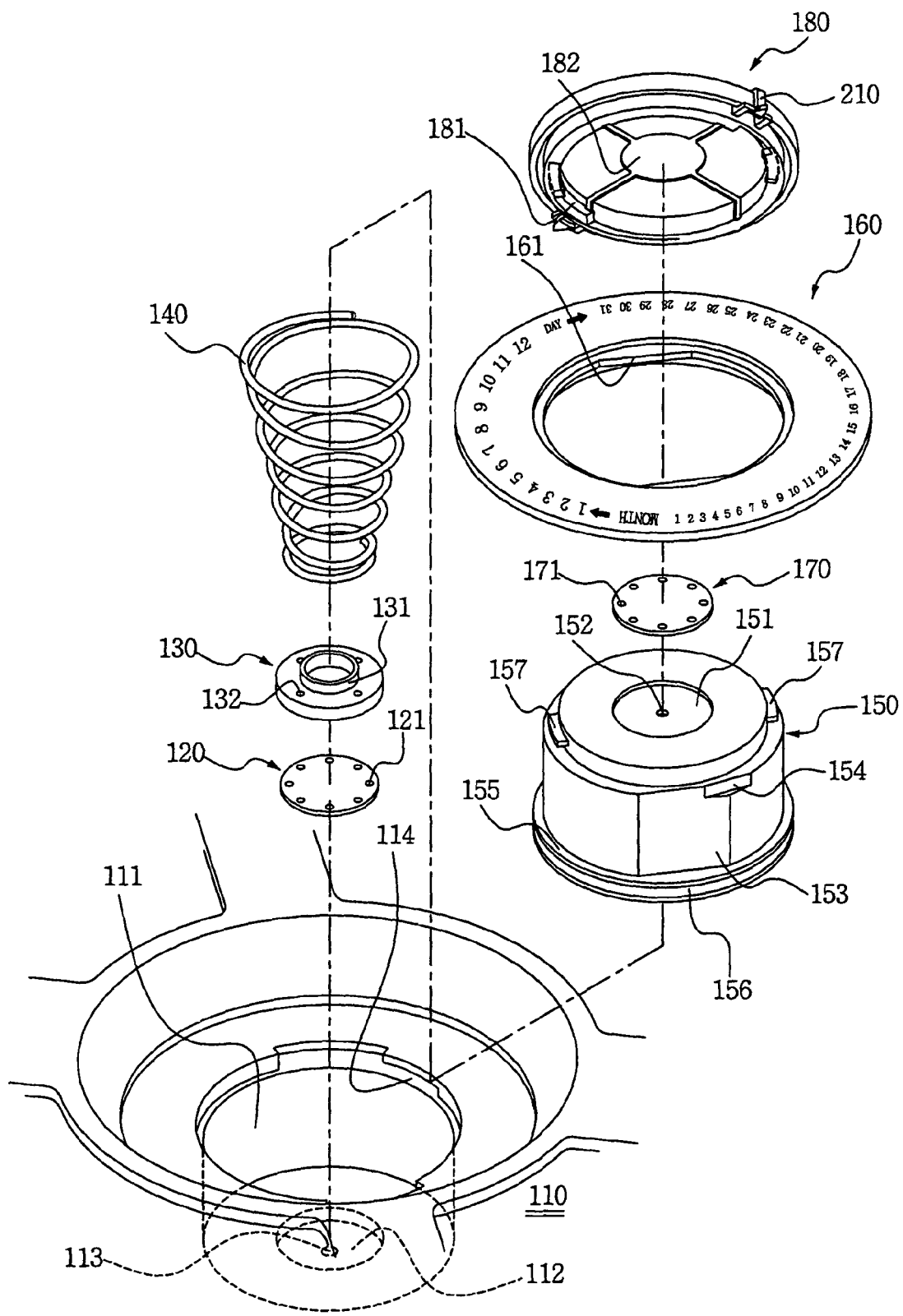
FIG. 6 is a perspective view illustrating a structure of separated main components according to another exemplary embodiment of the present invention.
Figure 7:
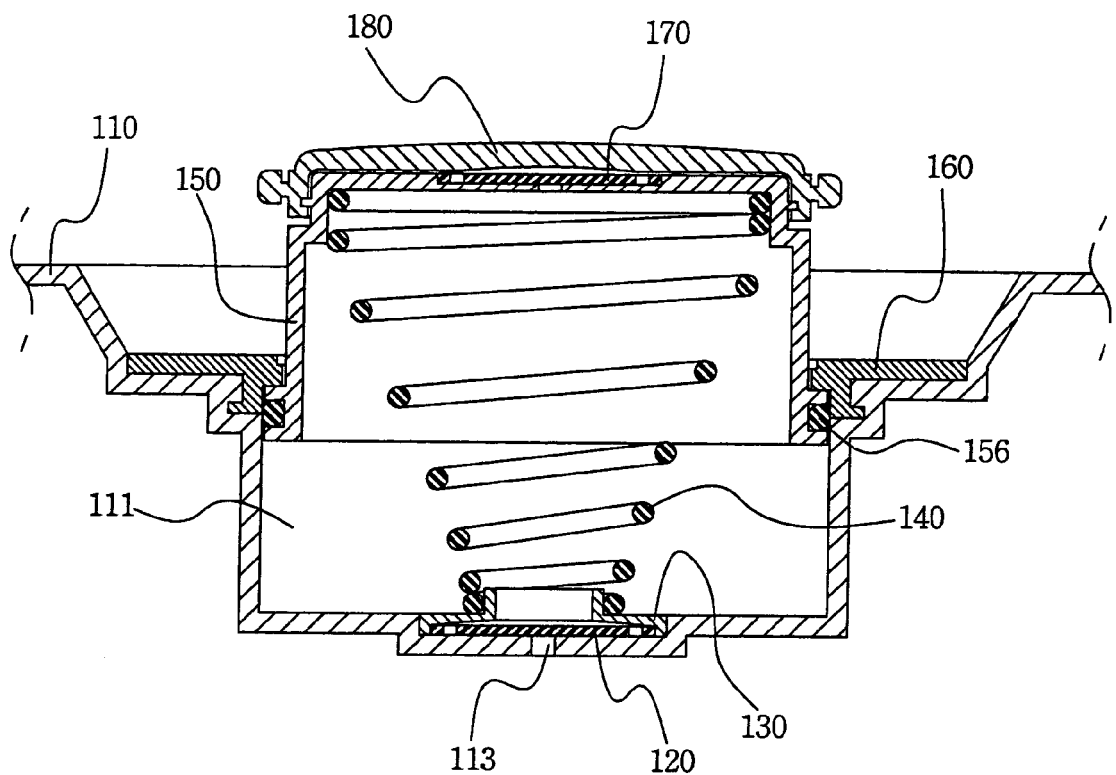
FIG. 7 is a sectional side view showing a combined structure of components referred to FIG. 6.

Differently from the construction of one exemplary embodiment described above, FIG. 6 is a perspective view illustrating a structure of separated main components according to another exemplary embodiment of the present invention, and FIG. 7 is a sectional side view showing a combined structure of components referred to FIG. 6, in which a reference numeral 110 designates a cover member for covering an upper part of a container member into which food is filled.

The cover member 110 is constructed to cover an upper part of the container member having a space that will be filled with food, and a center of the cover member 110 is downward concaved with a predetermined diameter to form a sliding flute 111. A bottom center of the sliding flute 111 is downward concaved with a diameter smaller than an inner diameter of the sliding flute 111 to form a first valve flute 112. A center of the first valve flute 112 is vertically pierced to form a suction aperture 113. Te sliding flute 112 is provided with a deviation preventing flute 114 that is formed in an upper end par of the sliding flute 112.

According to this exemplary embodiment, the present invention has the most remarkable characteristic that a pumping unit for forming vacuum in the interior of the container member is combined in one body with the sliding flute 111 of the cover member 110.

Such a pumping unit is largely classified into a first valve member 120, a valve guide member 130, a spring member 140, a piston member 150, a deviation preventing member 160, a second valve member 170 and a cap member 180.

The first valve member 120 is provided as a thin plate of soft material, and an outer circumference part of a plate face of the first valve member 120 has a plurality of air holes 121 that are formed with a predetermined interval by the same radius from a center thereof. The first valve member 120 is put in the interior of the first valve flute 112 corresponding to a lowest side of the sliding flute 111 of the cover member 110, to control the suction aperture 113 of the center.

The valve guide member 130 is formed by connecting ring shapes having different diameters as an upper part and a lower part thereof by using a horizontal upper face, wherein the horizontal upper face has a plurality of air holes 132 that are formed concentrically and that have a minute diameter. In the valve guide member 130, the upper part having a relatively small diameter is provided as a guide part 131, and the lower part having a relatively large diameter is inserted into the first valve flute 112 of the cover member 110, and an inner side of the valve guide member 130 is provided with the first valve member 120. Herewith, the first valve member 120 is minutely ascending and descending movable so as to control a suction of air inflowing through the suction aperture 113.

In the spring member 140, a lower end part thereof is put in an outer side of the guide part 131 of the valve guide member 130 and the spring member 140 is constructed elastically in a vertical direction. The lower end part of the spring member 140 is positioned on the valve guide member 130 so that the valve guide member 130 does not move in the interior of the first valve flute 112.

The piston member 150 is downward opened and has a hollow pipe shape, the interior of which accepts a position of the spring member 140 whose lower end part is put on the valve guide member 130. A center of an upper face of the piston member 150 is formed as a second valve flute 151 that is downward concaved with a predetermined diameter, and a center of the second valve flute 151 is formed as an exhaust aperture 152 piercing vertically. Opposite partial circumference faces in an outer circumference face of the piston member 150 are formed as a vertically cut shape to form rotation preventing faces 153 of a plane shape. In one side of an upper end part of the rotation preventing face 153, a stopping flute 154 is formed. Also, in an outer circumference part of a lower end part of the piston member 150, a stopping jaw 155 more extended from its outer diameter to an outer side is formed, and the stopping jaw 155 is provided with a sealing unit 156 that is equipped to closely adhere with an inner circumference face of the sliding flute 111 of the cover member 110.

A length of the piston member 150, namely, height is desirably formed longer than a height of the sliding flute 111 of the cover member 110.

Figure 8:
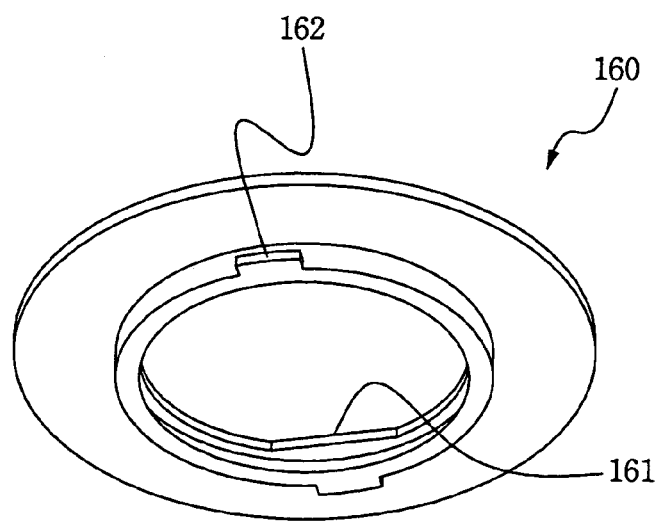
FIG. 8 is a bottom perspective view illustrating a deviation preventing member according to other exemplary embodiment of the present invention.

The deviation preventing member 160 is constructed as a ring shape to be matching combined with an outer circumference face of the piston member 150 so as to be attachable and detachable. Opposite inner circumference faces of the deviation preventing member 160, which correspond to the rotation preventing faces 153 of the piston member 150, are formed as straight line-shaped faces 161, and an outer circumference face of a lower end part downward extended from such inner circumference face is formed as protrusions 162 in one body as shown in FIG. 8, to be sliding combined with the deviation preventing flute 114 formed in the upper end part of the sliding flute 111 of the cover member 110. That is, the deviation preventing member 150 is combined with the deviation preventing flute 114 so that a lower face of the deviation preventing member 150 closely adheres with a circumference part of an upper end part of the sliding flute 111.

Then, the piston member 150 is assembled with the deviation preventing member 160, which is also combined with the cover member 110, to thus prevent the piston member 150 from rotating and deviating upward.

The second valve member 170 has the same shape as the first valve member 120 and is a thin plate of soft material, and has numerous air holes 171. The second valve member 170 is put in the second valve flute 151 formed on an upper face of the piston member 150 to control a discharge of air discharged through the exhaust aperture 152 of the center.

In the cap member 180, an inner diameter thereof is constructed to be closely combined with an outer diameter of an upper end part of the piston member 150, and its inner circumference face has insertion flutes 181 into which the protrusions 157 formed in an upper end part of an outer circumference face of the piston member 150 can be matching inserted. That is, the cap member 180 rotates in one side direction under a state of pressing the piston member 150 to combine with the piston member 150, and the combination can be disassembled by a rotation in its opposite direction. A deviation of the second valve member 170 equipped in an upper end face of the piston member 150 is prevented by such a combination between the cap member 180 and the piston member 150. Further, numerous exhaust flutes 182 face-concaved by a given depth are formed in a radial type in a ceiling face and an inner circumference face of the cap member 180 so that air of the interior discharged through the exhaust aperture 152 of the piston member 150 can be smoothly discharged outward.

Meanwhile, specifically from the pumping units described above, as shown in FIGS. 9 and 10, a vacuum removal member 190 is equipped in one side of the pumping units, in the cover member 10, 110.

The vacuum removal member 190 is constructed to lead air from the outside into the interior of the container member through a manipulation outside. At this time, a type of pressing outside may cause the vacuum state to be easily released by an error manipulation, therefore it is most desirable to equip a type of upward pulling outside even with some inconvenience.

Figure 9:
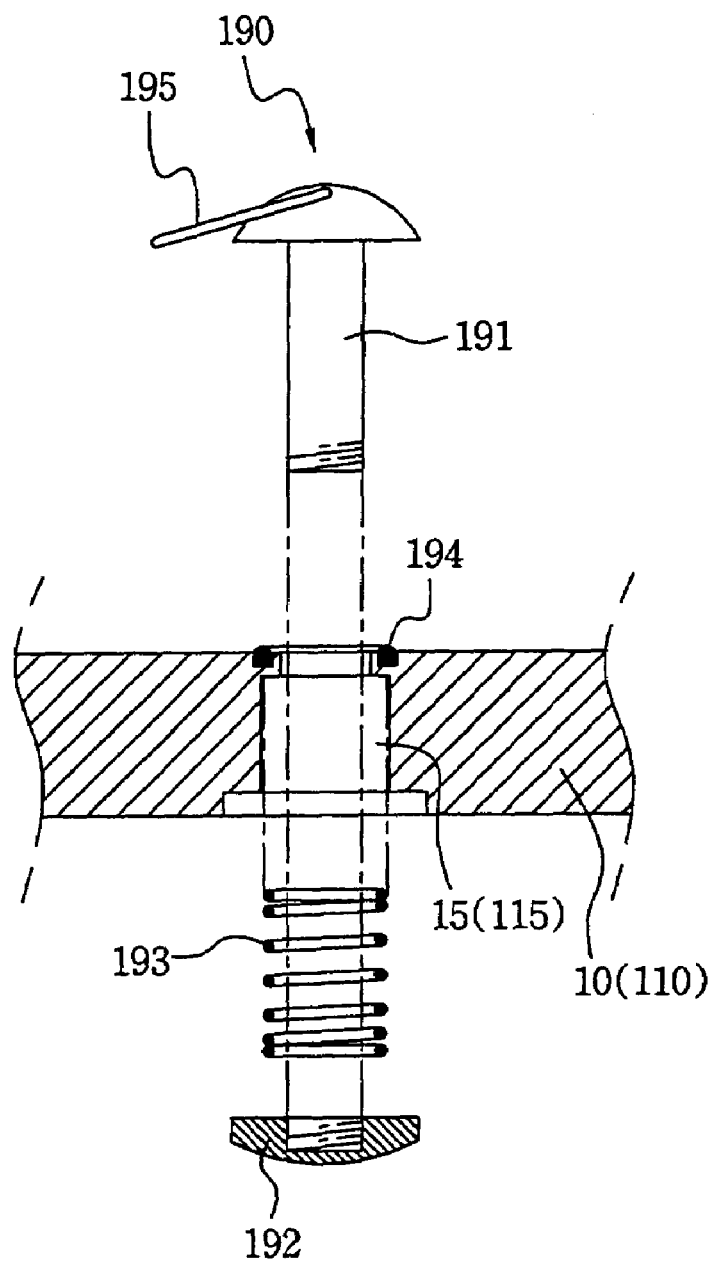
FIGS. 9 and 10 are sectional side views illustrating a disassembled vacuum removal member according to an exemplary embodiment of the present invention.

As one of theses constructions, as shown in FIG. 9, one side of the cover member 10, 110 is pierced vertically and the vacuum removal member 190 is equipped with such pierced portion, and a valve body 191 on an outer circumference face of which a spring 193 is wound, is equipped in an air inlet 15, 115 formed by vertically piercing through one side of the cover member 10, 110. An upper end part of the valve body 191 is formed larger than a diameter of the air inlet 15, 115 of the cover member 10, 110. A lower end part of the valve body 191 is formed to be partially projected from a lower part of the cover member 10, 110 and to be screw combined with a spring supporter 192, to thus prevent the spring 193 from deviating from the valve body 191. In the meantime, a sealing unit 194 is equipped between a lower face of a head part of the valve body 191 and its opposite cover member 10, 110, to closely maintain a sealing state between the interior and exterior of the container.

In the head part of the valve body 191, a loop 195 of a ring shape into which at least one finger can be inserted, is equipped so as to upward lift the valve body 191.

Figure 10:
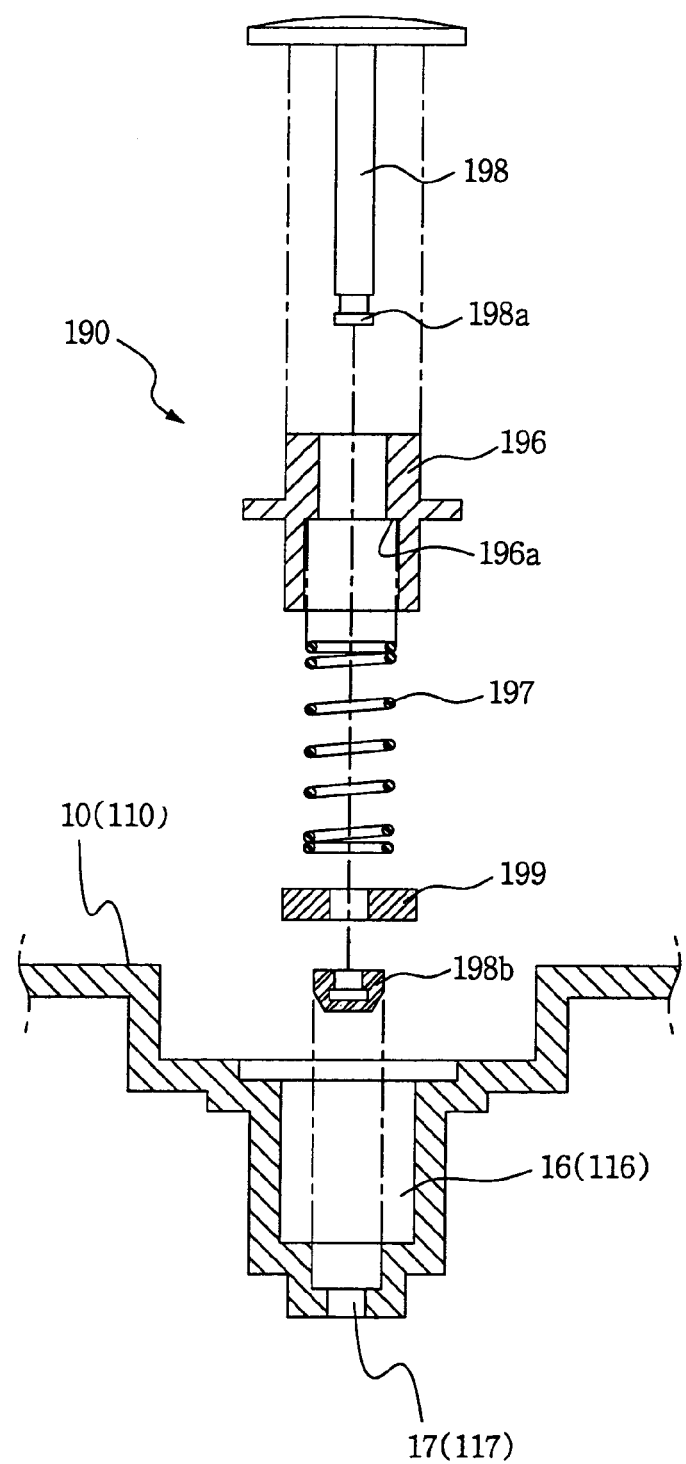

As another construction different from the construction described above, in the vacuum removal member 190 shown in FIG. 10, one side of the cover member 10, 110 is downward concaved to thus form an air leading flute 16, 160, and in a lower end part of the air leading flute 16, 160, an air inflow hole 17, 117 is formed being pierced vertically so that air inflows through the air inflow hole 17, 117 into the interior of the container member that had a vacuum state, to thus open the cover member 10, 110.

In the interior of the air leading flute 16, 116, a flange face of a guide 196 having a pipe shape adheres with the cover member 10, 110 through use of an adhesive agent etc. and is solidly fixed thereto. An elevating shaft 198 elastically supported by a spring 197 is inserted into the guide 196 to be ascending and descending movable. At this time, under such an insertion state, an upper end part of the elevating shaft 198 positioned on an upper side of the guide 196 has an outer diameter larger than an outer diameter of the guide 196, and a stopping jaw 198a is formed in a lower end part of the elevating shaft 198 being more projected through a lower side of the guide 196. A packing 198b is provided surrounding the stopping jaw 198a, and an upper part of the packing 198b is axis combined with a spring supporter 199. An inner circumference face of the guide 196 is minutely extended toward an inner side to form a spring support jaw 196a so that the spring 197 is combined between the spring support jaw 196a and the spring supporter 199 equipped on an upper side of the packing 198b.

In such a configuration the packing 198b actually controls an inflow and outflow of air through the air inflow hole 17, 170 in a lower part of the air leading flute 16, 116.

Operations in such configuration will be described in detail according to exemplary embodiments of the present invention, as follows.

Figure 11:
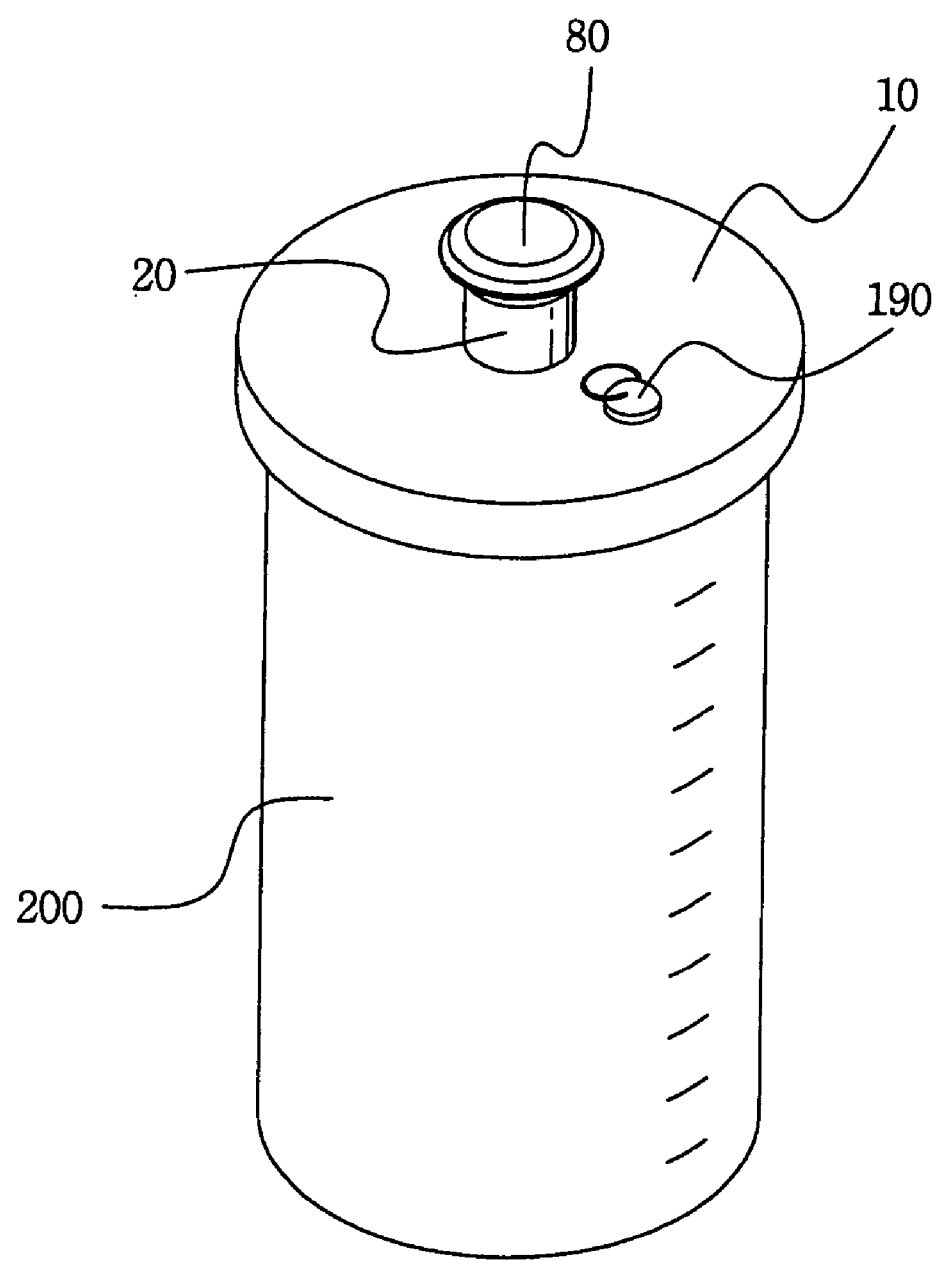
FIGS. 11 and 12 are perspective views illustrating a container provided as a combined state according to exemplary embodiments of the present invention.
Figure 12:
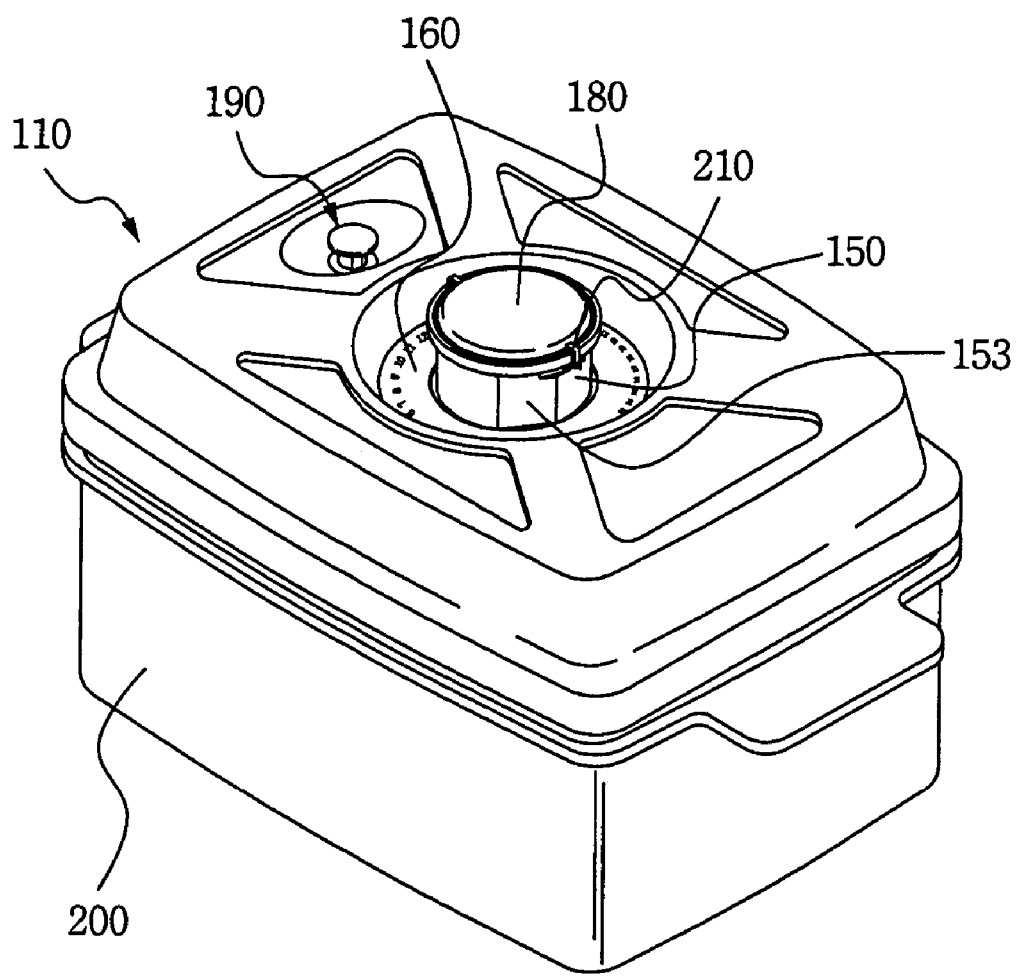

Referring to FIGS. 11 and 12, the cover member 10, 110 is simply put on an upper part of a container member 200, and the piston member 20, 150 projected from an upper part of the cover member 10, 110 is elevating manipulated to suck air from the interior of the container member 200 and thus make the interior of the container member 200 a vacuum state, therefore the cover member 10, 110 adheres with the container member 200 solidly and closely.

Figure 13:
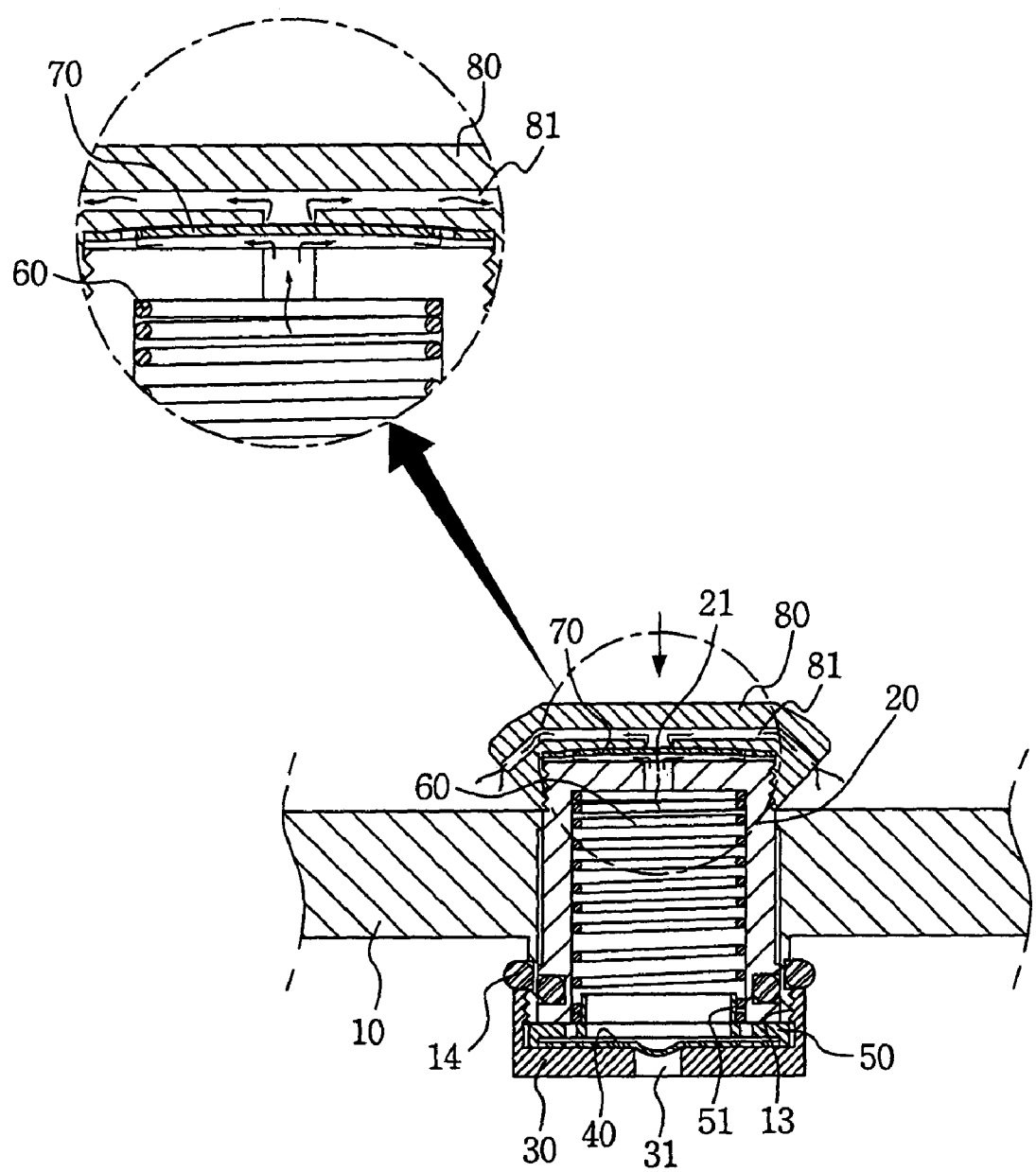
FIGS. 13 and 14 are enlarged sectional side views of main components showing an operational state of discharging air filled in the interior of a piston member to the outside by pressing the piston member according to an exemplary embodiment of the present invention.
Figure 14:
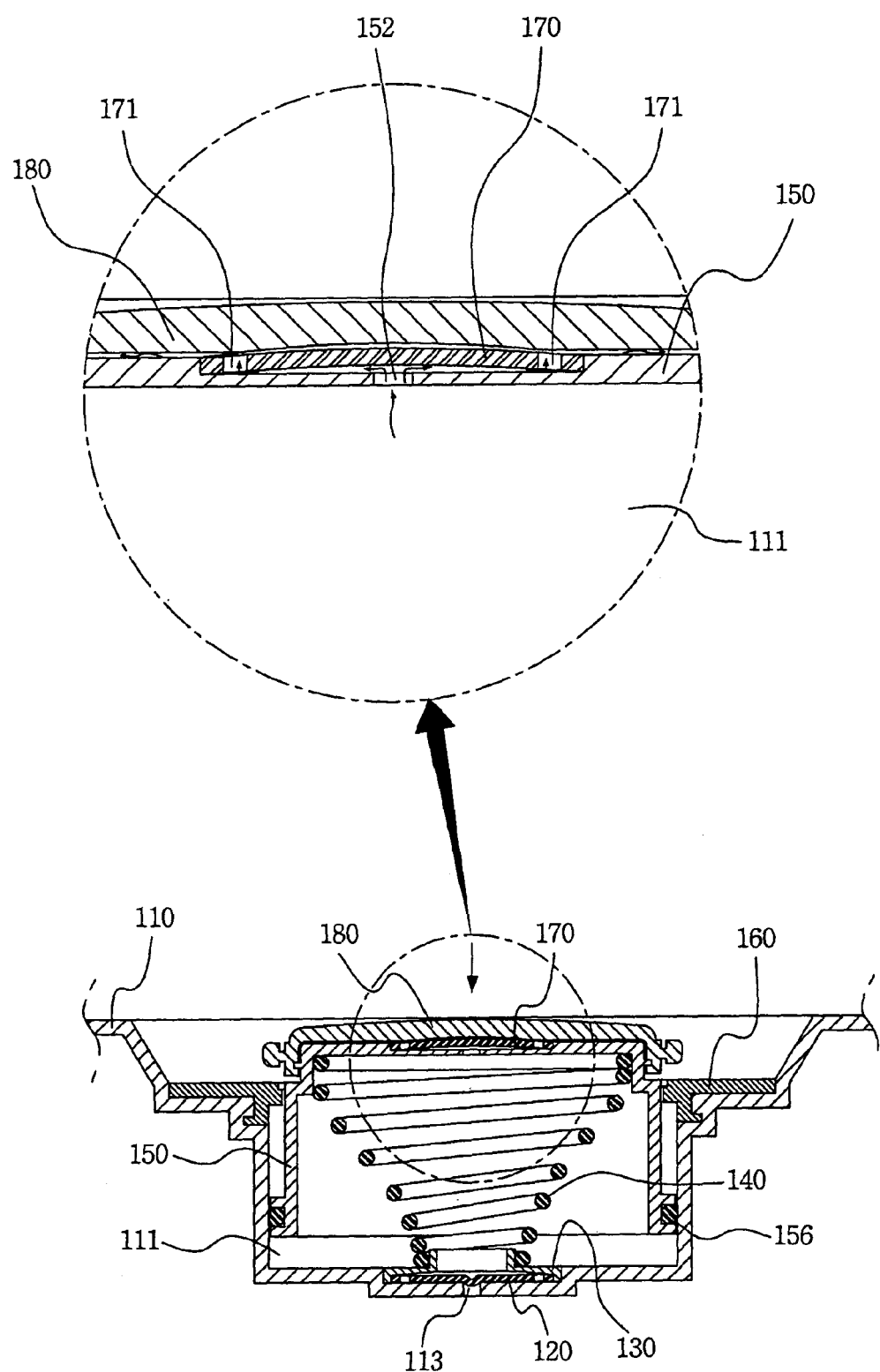

Describing more in detail, food of a given quantity is put in the container member 200, and the container member 200 is covered with the cover member 10, 110, then an upper cap member 80 or a cap member 180 is pressed by a palm, to then drop the piston member 20, 150 as shown in FIGS. 13 and 14. At this time, the first valve member 40, 120 more closely adheres with an upper face of the lower cap member 30 or the cover member 110 of the first valve flute 112, to close the suction aperture 31, 113, while the second valve member 70, 170 moves minutely upward, being distant from an upper face of the piston member 20, 150 to open the first exhaust aperture 21 or the exhaust aperture 152, thus air filled in the piston member 20, 150 is discharged by force to the outside according to a dropped level of the piston member 20, 150.

Subsequently, once removing a pressure that pressurizes the upper cap member 80 or the cap member 180, the piston member 20, 150 automatically rises by an elastic spring-out force of the spring member 60, 140 provided in the interior thereof.

Figure 15:
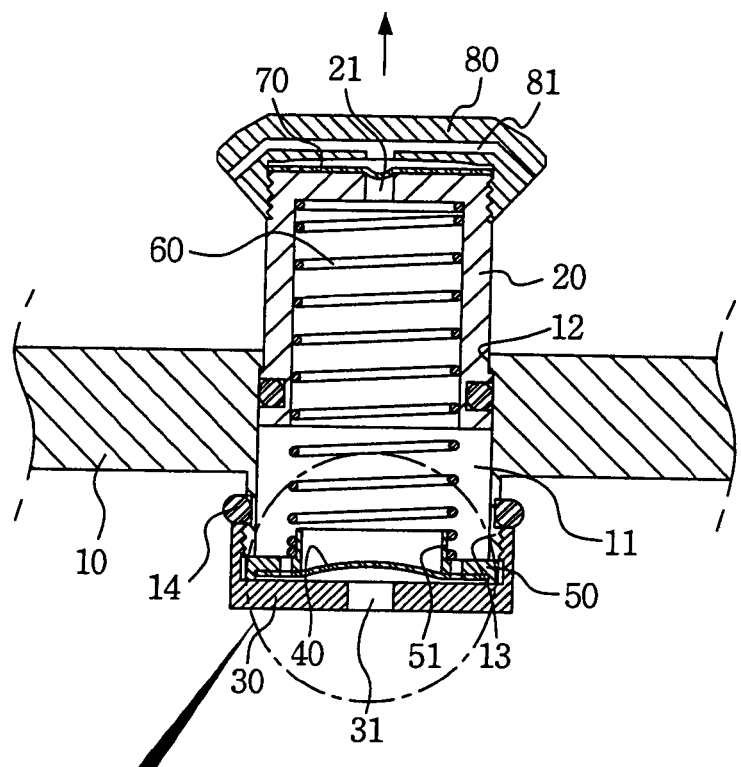
FIGS. 15 and 16 are enlarged sectional side views of main components illustrating an operational state of sucking air from the interior of a container member by an ascending operation of the piston member using an elastic force of a spring member so as to make the container member a vacuum state according to an exemplary embodiment of the present invention.
Figure 15:
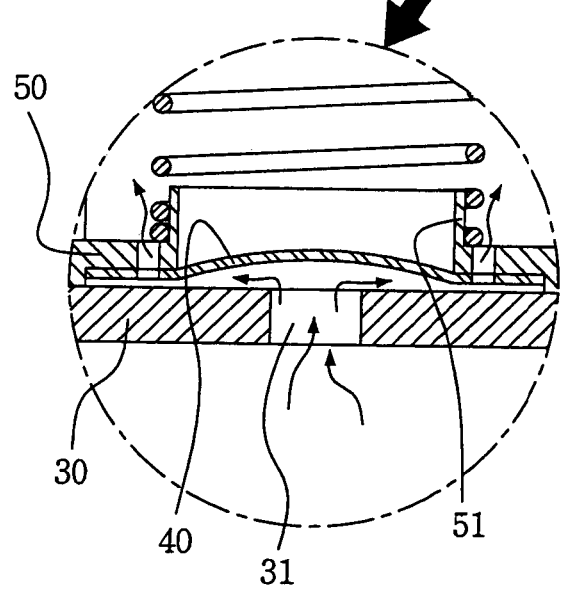
Figure 16:
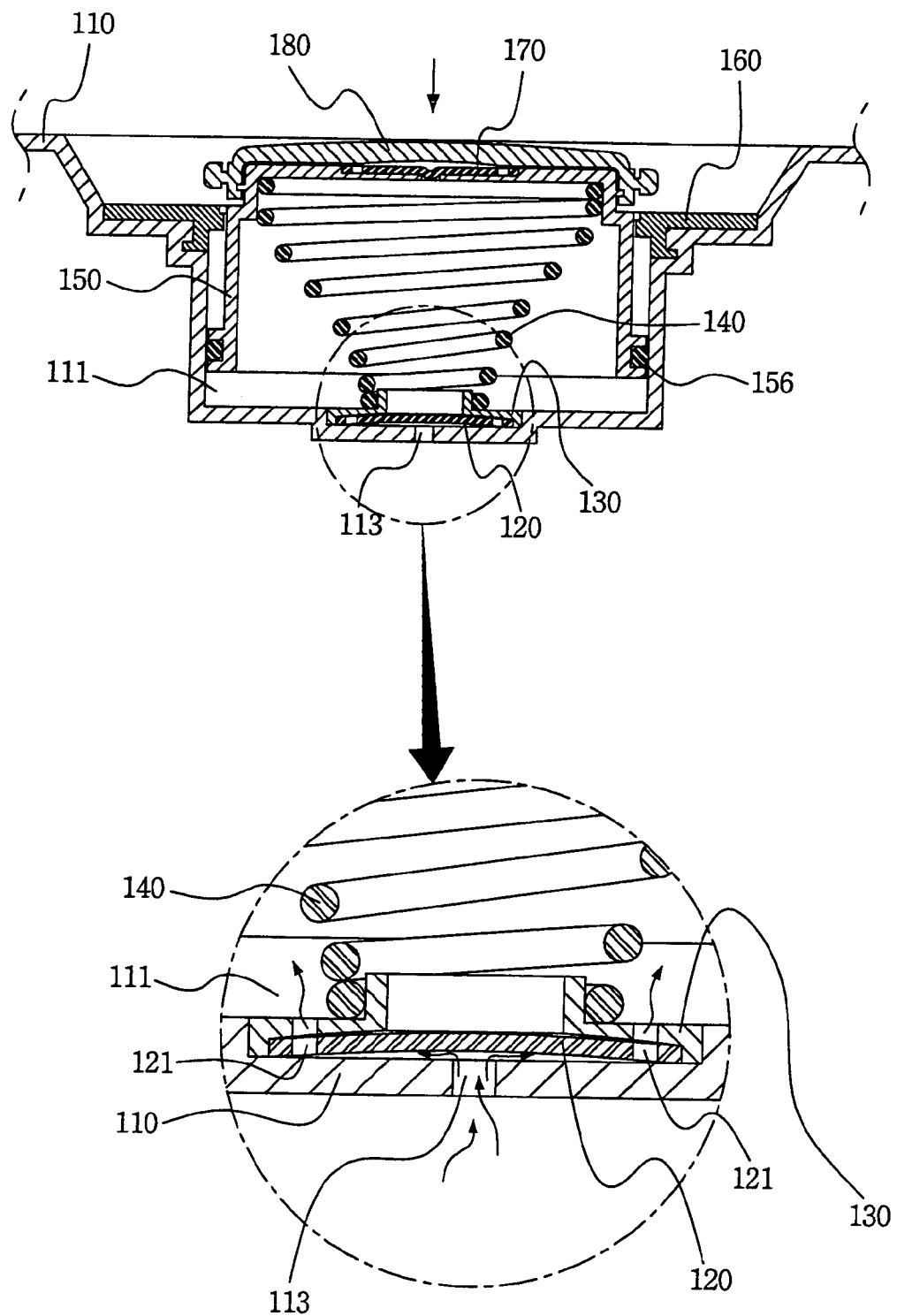

Herewith, when the piston member 20, 150 ascends, the first valve member 40, 120 and the second valve member 70, 170 operate oppositely to the dropping case of the piston member 20, 150. That is, as shown in FIGS. 15 and 16, once the piston member 20, 150 ascends by the elastic spring-out force of the spring member 60, 140, an interior space volume of the piston member 20, 150 increases to minutely ascends of the first valve member 40, 120 so that air in the interior of the container member 200 is sucked through the suction aperture 31, 113, and oppositely through the second valve member 70, 170, the first exhaust aperture 21 or the exhaust aperture 152 formed in an upper face of the piston member 20, 150 is closed so as not to discharge air filled in the piston member 20, 150 to the outside.

As was described above, once the piston member 20, 150 rises by pressing the upper cap member 80 or the cap member 180 or by removing the pressurized pressure, air from the interior of the container member 200 is sucked into the interior of the sliding hole 11 or the sliding flute 111, and is again discharged to the outside. Such a repetitive operation makes the interior of the container member 200 a vacuum state.

In other words, air is discharged by force from the interior of the container member 200 to the outside to make the interior of the container member 200 a lower pressure state, therefore food put in the container can be preserved for more prolonged time, maintaining an original quality.

In the meantime, as described above it is most desirable to maintain a state of at maximum dropping the piston member 20, 150, immediately after the interior of the container member 200 becomes a vacuum state. That is, when dropping the piston member 20, 150, air in the interior of the sliding hole 11 or the sliding flute 111 is completely discharged to the outside, thus the interior of the sliding hole 11 or the sliding flute 111 becomes a low pressure state. Therefore, in maintaining such a low pressure state, air can inflow from the container member 200 into the sliding hole 11 or into the interior of the sliding flute 111, but a phenomenon that air flows backward into the interior of the container member 200 never occur.

Figure 17:
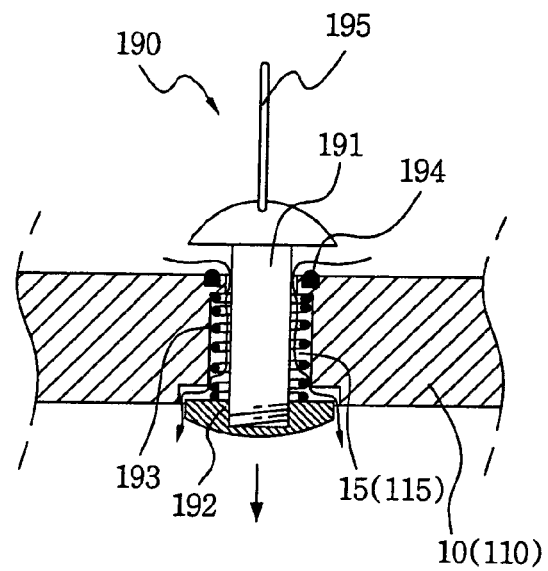
FIGS. 17 and 18 are sectional side views illustrating an operational state of removing vacuum from a vacuum removal member according to an exemplary embodiment of the present invention.
Figure 18:
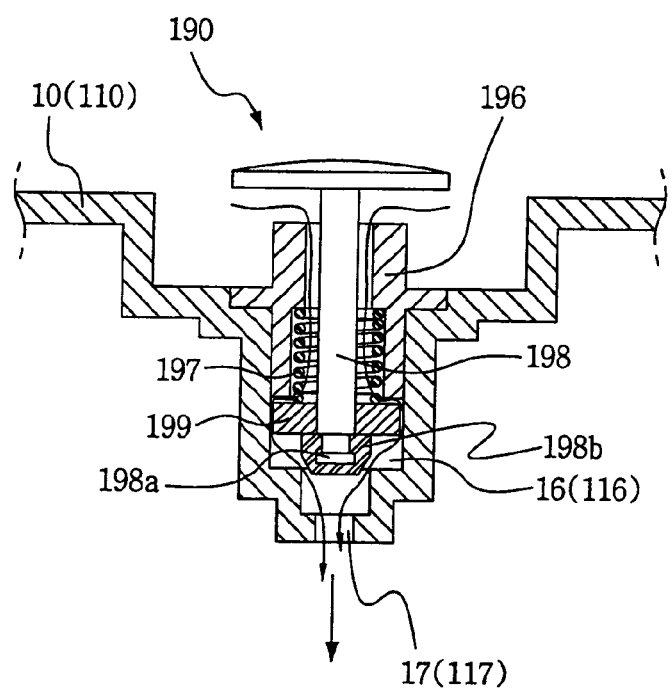

To take out food after preserving the food in the container member 200 for some period, as shown in FIGS. 17 and 18, a user grasps and pulls upward an upper end part of the elevating shaft 198 or the loop 195 combined with an upper part of the valve body 191 of the vacuum removal member 190, then the air inlet 15 or the air inflow hole 17, 117 is connected through the outside, and air inflows into the interior of the container member 200 having pressure lower than the atmosphere to thus remove the vacuum. Once the vacuum was removed, the cover member 10, 110 can be easily separated from the container 200.

Figure 19:
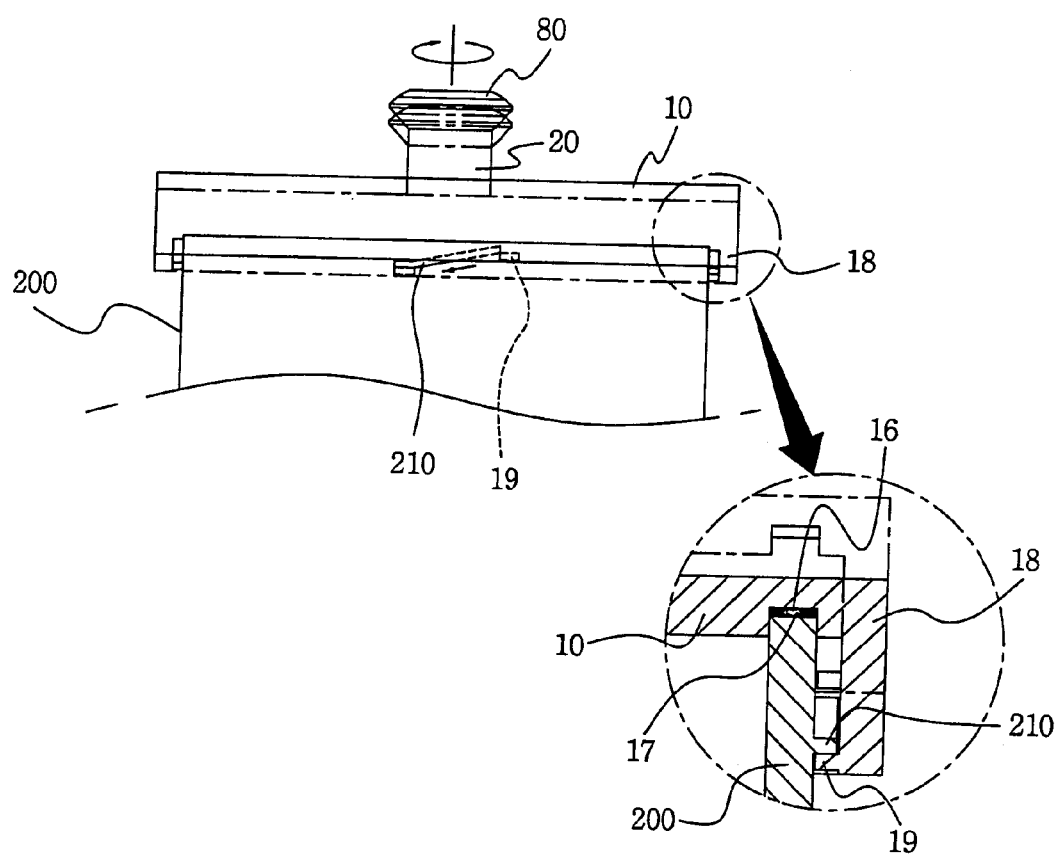
FIG. 19 is a diagram illustrating a fastening structure of a container member and a cover member.

In such a configuration, if particularly herein providing the container member 200 and the cover member 10, 110 of a cylinder type, in order for more solid combination, as shown in FIG. 19 a sealing flute 16 being concaved with a width minutely larger than a thickness of the container is formed in an outer circumference lower face of the cover member 10, 110; and this sealing flute 16 is provided with a packing 17 that is solidly inserted into this sealing flute 16 so that an upper end part of the container 200 closely adheres and is combined with the packing 17.

Further, an outer circumference part of the cover member 10, 110 is formed minutely larger than an outer diameter of the container 200, and the outer circumference part is downward extended by a given height to form a combination end part 18. Also, in an inner circumference face of the combination end part 18, matching protrusions 19 are protruded by a given interval from the inner circumference face to an outer circumference face of the container member 200. In an outer circumference face of the container member 200 opposite to the matching protrusion 19, a fastening protrusion 210 is formed being projected from an upper part toward a lower part and an outer side by a predetermined slow tilt angle, so that the matching protrusion 19 sliding moves along the tilt angle of the fastening protrusion 210 and more solidly combines the cover member 10, 110 with the container member 200.

Figure 20:
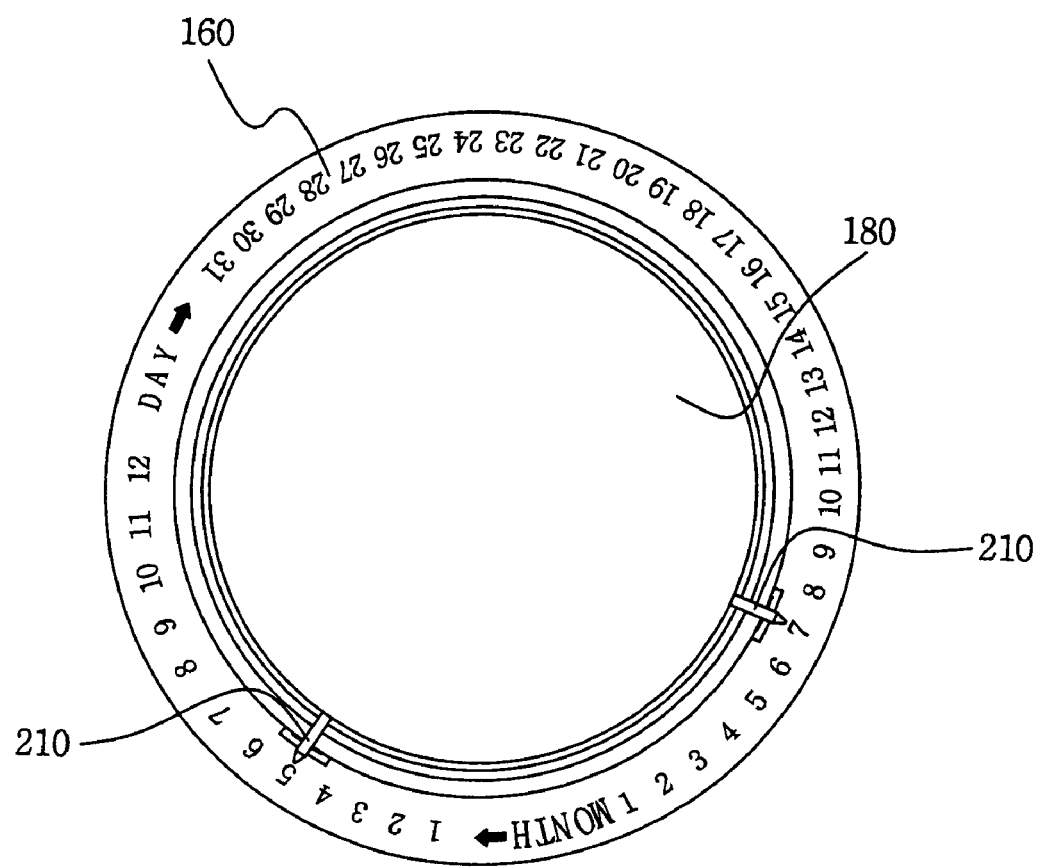
FIG. 20 is a plan view showing a configuration indicating a preserving start day of food according to an exemplary embodiment of the present invention.

In addition, on each of outer circumference parts of upper faces of the cap member 80 and the deviation preventing member 160, a month and a date for a preserving start time of food can be displayed. Further, in an outer circumference ending part of the upper cap member 80 and the cap member 180, as shown in FIG. 20 one pair of pointers 210 indicating the preserving start month and date of food can be equipped to be movable along an outer circumference face thereof, to thus display an initial preserving date of food.

Accordingly, the configuration capable of generating vacuum can be easily provided to the cover member 10, 110 of the container member 200 through a simple screw-combination or assembly, therefore food can be preserved more sanitarily.

The vacuum forming manipulation is also too simple to easily use by anyone, and particularly a required vacuum pressure can be supplied more rapid, which provides a using convenience.

Additionally, unless a manipulation for removing the vacuum is intentionally performed in the midst of preserving food through use of the vacuum, the vacuum is not removed, therefore a stabilized preserving state of food can last even in dealing with and moving the container 200 of the vacuum preserving state.

According to exemplary embodiments of the present invention, components of the invention are combined with one another through a screw-assembly or a simple assembly, thus the manufacture is easy and a repair for a loss of parts, etc. is very convenient. The vacuum pressure is formed by a pumping manipulation of elevating the piston member 20, 150 in an upper part of the cover member 10, 110, and a manipulating force is more reduced by a reactive force using the spring member 60, 140 to provide a considerably easy and convenient manipulation.

In addition, a required vacuum pressure can be formed rapid, and a size of components for generating the vacuum pressure is formed in proportion to a size of the container member 200, thus a time required in forming the vacuum pressure becomes almost similar and the manipulating force based on a size change of the container member 200 also becomes similar. In particular, food can be sanitarily preserved for longer time.

While the present invention has been particularly shown and described with reference to the exemplary embodiments described above, it will be understood by those skilled in the art that these exemplary embodiments do not limit the scope of the present invention. Rather, various changes in form and details may be made without departing from the spirit and scope of the invention as defined by the appended claims.

What is claimed is:

1. A vacuum container to preserve food, comprising:
   a cover member for covering an upper part of a container member having a space in which food is filled, said cover member having a sliding flute downward concaved in a center thereof with a predetermined diameter, wherein a bottom face center of said sliding flute is downward concaved with a diameter smaller than an inner diameter of the sliding flute to thus form a first valve flute, a center of said first valve flute being provided as a suction aperture piercing vertically thereon, and an upper end part of said sliding flute being provided as a deviation preventing flute;
   a first valve member, which has numerous air holes that are formed in an outer circumference part of a plate face thereof and which is put in the first valve flute to control the suction aperture provided in a center thereof;
   a valve guide member mounted whose lower part has a pipe shape in which the first valve member can minutely ascending and descending move, whose upper part is provided as a guide part that is formed being upward extended in a pipe shape having an inner diameter smaller than a diameter between ends of the air holes formed in the first valve member, and whose upper part face for connecting between outer circumference faces of an upper part and a lower part of the valve guide member has a plurality of air holes with a fine diameter;
   a spring member of which a lower end part is mounted on an outer side of the guide part of the valve guide member, and which has a vertical elasticity;

a piston member of a pipe shape opened downward, of which the interior accommodates the spring member, and of which a center of an upper face has a second valve flute downward concaved with a predetermined diameter, a center of said second valve flute having an exhaust aperture piercing vertically, and of which opposite portions of an outer circumference face are formed as rotation preventing faces of a vertically cut plane face shape, an upper end one side of said rotation preventing face being formed as a stopping flute, and of which an outer circumference part of a lower end part is provided with a stopping jaw formed being extended outward from an outer diameter, said stopping jaw being provided with a sealing unit to closely adhere with an inner circumference face of the sliding flute of the cover member;

a deviation preventing member, into which an outer circumference face of the piston member is matching inserted to be attachable and detachable, and which is mounted in an upper end part of the sliding flute, and which is provided with a protrusion that is formed in one body from a lower end part extended downward from an inner circumference face thereof;

a second valve member mounted in the second valve flute formed in an upper face of the piston member, to control the exhaust aperture formed in the center of the piston member; and a cap member, which has an insertion flute formed in an inner circumference face thereof, said insertion flute being insertion combined with a protrusion that is formed being projected outward from an upper end part of an outer circumference face of the piston member, and which is provided with an exhaust flute that is formed by a radial type in a ceiling face and an inner circumference face thereof.

2. The container of claim 1, wherein the cover member is provided with an air inlet formed in one side of the sliding hole, where said air inlet is equipped with a valve body on which a spring is wound from an upper part to an outer circumference face thereof, an upper end part of said valve body being formed larger than a diameter of the air inlet of the cover member, and a lower end part of said valve body being partially projected from a lower part of the cover member to be screw combined with a spring supporter and thus prevent the spring from deviating from the valve body, where said valve body is provided with a sealing unit that is equipped between a lower face of a head part of the valve body and its opposite cover member, and said head part of said valve body is provided with a vacuum removal member that is provided with a loop of a ring shape into which at least one finger can be inserted.

3. The container of claim 1, wherein the cover member is provided with an air leading flute formed being downward concaved at one side of the cover member, a lower end part of said air leading flute being provided as an air inflow hole piercing vertically, and the interior of said air leading flute being provided with a guide of a pipe shape whose flange face is stuck and solidly fixed to the cover member, where said guide is insertion combined with an elevating shaft elastically supported by the spring to be ascending and descending movable, an upper end part of said elevating shaft positioned in an upper side of the guide having an outer diameter larger than an outer diameter of the guide, and a lower end part of said elevating shaft projected through a lower side of the guide having a stopping jaw; where an upper part of said stopping jaw is covered with a packing, an upper part of said packing is axis combined with the spring supporter, an inner circumference face of said guide is minutely extended toward an inner side to thus form a spring support jaw so that the spring can be combined between the spring support jaw and the spring supporter supported by the packing.

4. The container of claim 1, wherein the deviation preventing member displays a month and a day for indicating a preserving start time of food in an outer circumference part thereof, an ending part of said outer circumference part being provided with one pair of pointers that is movable along an outer circumference face thereof and that indicates a preserving start month and date of the food.

* * * * *